United States Patent

Szajewski et al.

(10) Patent No.: US 6,781,724 B1
(45) Date of Patent: Aug. 24, 2004

(54) IMAGE PROCESSING AND MANIPULATION SYSTEM

(75) Inventors: Richard P. Szajewski, Rochester, NY (US); Allan F. Sowinski, Rochester, NY (US); John D. Buhr, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 479 days.

(21) Appl. No.: 09/592,816

(22) Filed: Jun. 13, 2000

(51) Int. Cl.$^7$ .......................... H04N 1/04; H04N 1/46; G03B 27/04; G03B 17/24

(52) U.S. Cl. .................. 358/487; 358/474; 358/506; 396/311; 355/123

(58) Field of Search ................... 358/487, 506; 355/123, 124, 125, 126, 40; 396/6, 311, 207, 208, 210, 310, 315, 319

(56) References Cited

U.S. PATENT DOCUMENTS

| | | |
|---|---|---|
| 4,553,156 A | 11/1985 | Douziech et al. |
| 4,591,923 A | 5/1986 | Urabe et al. |
| 4,631,578 A | 12/1986 | Sasaki et al. |
| 4,654,722 A | 3/1987 | Alkofer |
| 4,670,793 A | 6/1987 | Yamada et al. |
| 4,694,342 A | 9/1987 | Klees |
| 4,805,031 A | 2/1989 | Powell |
| 4,829,370 A | 5/1989 | Mayne et al. |
| 4,834,306 A | 5/1989 | Robertson et al. |
| 4,839,721 A | 6/1989 | Abdulwahab et al. |
| 4,841,361 A | 6/1989 | Matsunawa et al. |
| 4,891,713 A | 1/1990 | Mizukoshi et al. |
| 4,912,569 A | 3/1990 | Petilli |
| 4,920,501 A | 4/1990 | Sullivan et al. |
| 4,929,979 A | 5/1990 | Kimoto et al. |

(List continued on next page.)

FOREIGN PATENT DOCUMENTS

| | | |
|---|---|---|
| EP | 0961482 | 5/1999 |
| EP | 0961483 | 5/1999 |
| EP | 0961484 | 5/1999 |
| EP | 0961485 | 5/1999 |
| EP | 0961486 | 5/1999 |
| WO | 98/25399 | 6/1998 |
| WO | 98/31142 | 7/1998 |
| WO | 98/34397 | 8/1998 |
| WO | 99/40729 | 8/1999 |
| WO | 99/42954 | 8/1999 |
| WO | 99/43148 | 8/1999 |
| WO | 99/43149 | 8/1999 |

Primary Examiner—Edward Coles
Assistant Examiner—Jason Sherrill
(74) Attorney, Agent, or Firm—David A. Novais (57) ABSTRACT

An image processing and manipulation system provides a user the opportunity to customize images exposed on dry process photosensitive film. That is, the system of the present invention permits a user to choose a particular look that is to be associated with exposed images on photosensitive film. The looks can be, but are not limited to, for example, accurate color reproduction, portraiture, brilliant color, black and white, etc. Therefore, with the system of the present invention, a customer is presented with the option of choosing a photographic appearance and or look that the customer desires for planned images. In the system and method of the present invention, an order based on a photographic film selected by the customer and a selected appearance characteristic is associated with the images exposed on the film. A code is assigned to at least a sample of the selected film and/or the order. At a photofinishing site, the film is developed to produce the images captured by the user, and scanned to produce a digital record of the captured images. The digital record is thereafter digitally processed based on the user selected appearance characteristic to produce processed images that reflect the user selected appearance characteristic.

7 Claims, 7 Drawing Sheets

U.S. PATENT DOCUMENTS

| | | | |
|---|---|---|---|
| 4,937,662 A | 6/1990 | Matsunawa et al. | |
| 4,941,039 A | 7/1990 | E'Errico | |
| 4,962,542 A | 10/1990 | Klees | |
| 4,972,256 A | 11/1990 | Hirosawa et al. | |
| 4,977,521 A | 12/1990 | Kaplan | |
| 4,979,027 A | 12/1990 | Sakai | |
| 5,003,334 A | 3/1991 | Pagano et al. | |
| 5,003,494 A | 3/1991 | Ng | |
| 5,008,950 A | 4/1991 | Katayama et al. | |
| 5,012,333 A | 4/1991 | Lee et al. | |
| 5,031,852 A | 7/1991 | Dowling | |
| 5,049,984 A | 9/1991 | Moore, Jr. et al. | |
| 5,051,842 A | 9/1991 | Shimazaki | |
| 5,065,255 A | 11/1991 | Kimura et al. | |
| 5,070,413 A | 12/1991 | Sullivan et al. | |
| 5,081,692 A | 1/1992 | Kwon et al. | |
| 5,105,266 A | 4/1992 | Telle | |
| 5,105,469 A | 4/1992 | MacDonald et al. | |
| 5,107,346 A | 4/1992 | Bowers et al. | |
| 5,134,573 A | 7/1992 | Goodwin | |
| 5,200,777 A | 4/1993 | Zander | |
| 5,226,613 A | 7/1993 | Kataoka et al. | |
| 5,266,805 A | 11/1993 | Edgar | |
| 5,267,030 A | 11/1993 | Giorgianni et al. | |
| 5,300,974 A * | 4/1994 | Stephenson, III | 396/311 |
| 5,465,155 A | 11/1995 | Edgar | |
| 5,519,510 A | 5/1996 | Edgar | |
| 5,528,339 A | 6/1996 | Buhr et al. | |
| 5,541,645 A | 7/1996 | Davis | |
| 5,563,717 A | 10/1996 | Koeng et al. | |
| 5,582,961 A | 12/1996 | Giorgianni et al. | |
| 5,644,647 A | 7/1997 | Cosgrove et al. | |
| 5,649,260 A | 7/1997 | Wheeler et al. | |
| 5,692,221 A | 11/1997 | Tobioka et al. | |
| 5,694,484 A | 12/1997 | Cottrell et al. | |
| 5,756,269 A | 5/1998 | Ishikawa et al. | |
| 5,790,277 A | 8/1998 | Edgar | |
| 5,835,627 A | 11/1998 | Higgins et al. | |
| 5,851,745 A | 12/1998 | Takeuchi | |
| 5,851,749 A | 12/1998 | Okawa et al. | |
| 5,858,629 A | 1/1999 | Ishikawa et al. | |
| 5,871,880 A | 2/1999 | Makuta et al. | |
| 5,874,203 A | 2/1999 | Morita et al. | |
| 5,888,704 A | 3/1999 | Kikuchi | |
| 5,945,264 A | 8/1999 | Asami et al. | |
| 5,962,205 A | 10/1999 | Arakawa et al. | |
| 5,965,332 A | 10/1999 | Kikuchi | |
| 5,976,771 A | 11/1999 | Kosugi et al. | |
| 5,988,896 A | 11/1999 | Edgar | |
| 5,995,654 A | 11/1999 | Buhr et al. | |
| 6,021,277 A | 2/2000 | Sowinski et al. | |
| 6,022,673 A | 2/2000 | Ishikawa | |
| 6,048,110 A | 4/2000 | Szajewski et al. | |
| 6,051,359 A | 4/2000 | Ohkawa et al. | |
| 6,062,746 A | 5/2000 | Stoebe et al. | |
| 6,272,287 B1 * | 8/2001 | Cipolla et al. | 396/6 |

\* cited by examiner

IMAGE PROCESSING AND MANIPULATION SYSTEM

FIELD OF THE INVENTION

The present invention relates to a photofinishing system as well as an image processing and manipulation arrangement which includes digital image processing.

BACKGROUND OF THE INVENTION

Conventional photofinishing systems and or arrangements have a long history of attempting to supply customers with convenient and simple ways to take pictures that serve to record their everyday lives. In the conventional approach to picture taking, a customer exposes images on a roll of film and delivers the roll of film to a retailer or photofinishing site for processing. These systems require wet processing and can be slow and inconvenient for customers to employ either themselves or indirectly with the support of a photofinisher. The processed film is thereafter returned to the customer along with prints and such. Normally, the customer does not have an opportunity to choose a desired appearance characteristic or look for the images to be exposed when he first purchases the roll of film other than by the advertised properties of, or previous experience with a particular film brand. More specifically, the customer does not have an opportunity to choose an appearance characteristic or look, such as color reproduction, portraiture, brilliant color, black and white, old fashioned sepia tones, selected levels of color intensity, selected levels of contrast, etc., which are to be associated with the exposed images. Further, the customer does not have the opportunity to select and obtain multiple looks of the same image or multiple looks for distinct images on the same roll. Further, these systems require wet processing and can be slow and inconvenient for customers to employ.

SUMMARY OF THE INVENTION

The present invention provides for a unique image processing and manipulation system which gives the customer an opportunity to choose a particular appearance or look for images which he/she exposes on a photosensitive film. More specifically, the present invention provides for a system which enables a picture taker to customize the exposed images on the photosensitive film, by having a photofinisher offer different looks which can be associated with the images.

The present invention provides for an image processing method which comprises the steps of creating a user order based on a user selected dry process photographic film and a user selected appearance characteristic that is to be associated with at least one image exposed on the user selected photographic film, with the user selected appearance characteristic being selected from a plurality of appearance characteristics; developing the user selected photographic film to produce images captured by the user; scanning the developed user selected photographic film to produce a digital record of the captured images; and digitally processing the digital record file of the captured images based on the user selected appearance characteristic to produce processed images which reflect the user selected appearance characteristic.

The present invention further relates to an imaging system which comprises a developing station for developing a dry process photographic film to produce images exposed on the film; a code reader for reading a unique code on the photographic film, with the unique code comprising information representing a selected appearance characteristic which is to be associated with the images from the developed photographic film; a scanner for scanning the developed photographic film to provide for a digital record file of the images; and a digital image processor for processing the digital record file based on the unique code, so as to produce processed images which have been corrected to reflect the selected appearance characteristic.

The present invention further relates to a method of providing image processing services by a photofinisher to a customer which comprises the steps of creating a customer order based on an unexposed dry process photographic film and an appearance characteristic selected by a customer which is to be associated with images captured on the selected photographic film, with the appearance characteristic being selected by the customer from a plurality of appearance characteristics; assigning a code representative of at least one of the selected unexposed photographic film and the customer order; storing the code in a customer database; and supplying the customer with the selected unexposed photographic film.

In a further feature of the invention noted above, after exposure of the film by the customer and return of the exposed dry process film to the photofinisher, the method comprises the further steps of: developing the photographic film to produce images captured by the customer; scanning the developed photographic film to produce a digital record of the captured images; reading the code on the photographic film and associating the code with the digital record file of the captured images; searching the customer database and retrieving the selected appearance characteristic based on the stored code; associating the selected appearance characteristic with the digital record of the captured images; and digitally processing the digital record file of the captured images based on the selected appearance characteristic to produce processed images which reflect the selected appearance characteristic.

The present invention further relates to an imaging system which comprises a reader for reading an identification associate with a photographic film, with the identification identifying the photographic film as compatible with a dry processing; and a developing station for developing a dry process photographic film to produce images exposed on the film, wherein compatible film identified by the reader is developed at the developing station.

The present invention further relates to an image processing method which comprises the steps of: reading an identification associated with a photographic film, with the identification identifying the photographic film as compatible with dry processing; and developing the compatible film at a developing station to produce images exposed on the film.

DETAILED DESCRIPTION OF THE INVENTION

Figure 1:
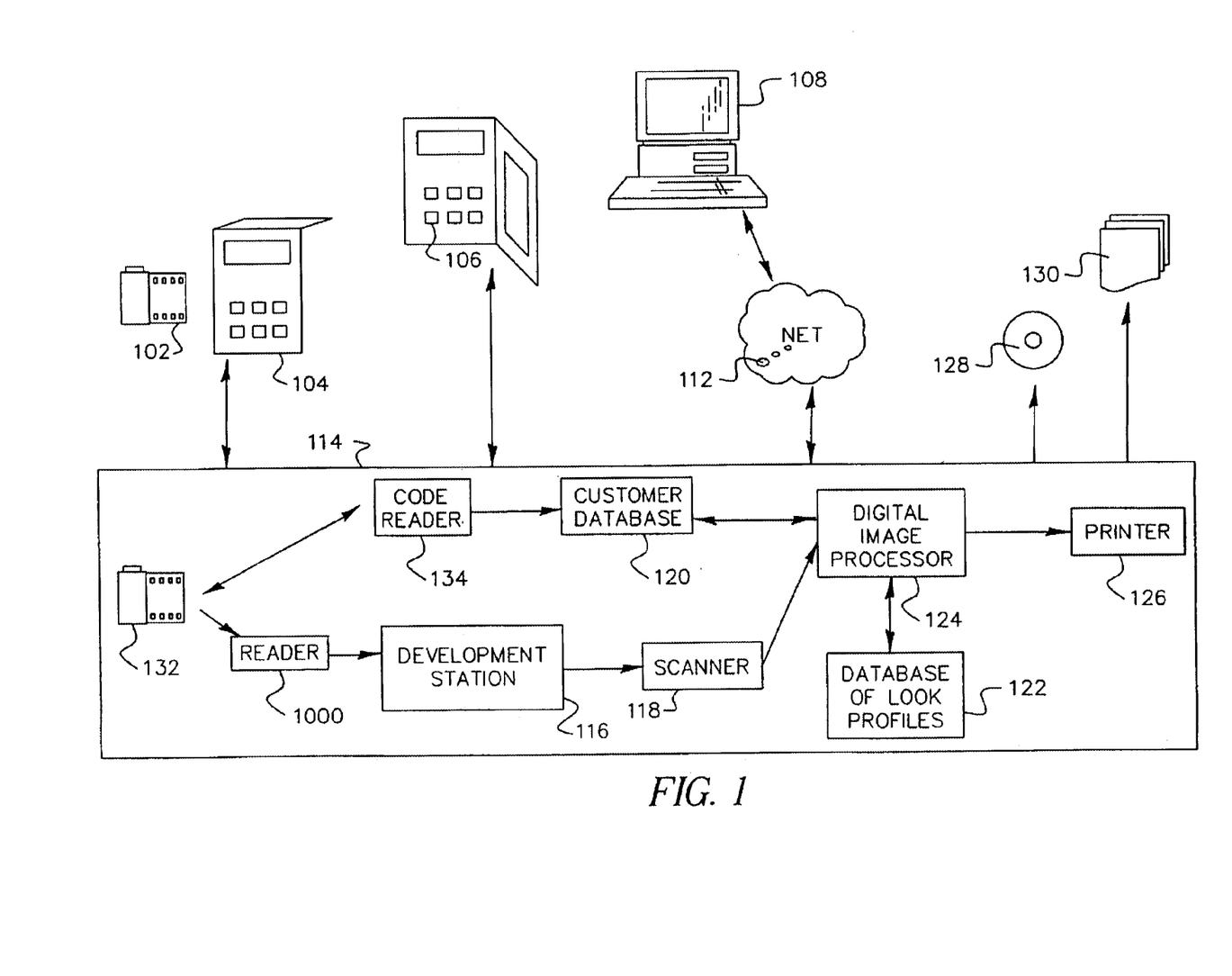
FIG. 1 is a block diagram showing a photofinishing system according to the present invention.

Referring first to FIG. 1, in a feature of the invention, a customer can access a photofinisher's web-site via an electronic communication such as an internet service 112, and can place an order for unexposed photographic film 102 during an interactive session through the customer's own web access device 108. While at the web-site, the customer is presented with sample scenes that demonstrate a range of available looks. These possible looks include but are not limited to: accurate color reproduction, portraiture, brilliant color, black and white, old fashioned sepia tones, selected levels of color intensity, selected levels of contrast, selected levels of detail reproduction, and selected levels of grain or noise. The customer is further presented with the option of choosing the photographic look that the customer desires for the planned images. A unique code is assigned to an individual sample of unexposed photographic film and to the order. The code is stored by photofinisher 114 in a customer database 120. During the course of the transaction, if the customer chooses a particular look, that choice is stored along with the code in the customer database.

Photofinisher 114 then supplies the customer with unexposed film and a mailer 104 for returning the film to photofinisher 114 after picture taking. If the customer has chosen a particular look, the mailer can be pre-endorsed with the chosen look. After picture taking, the customer has the option of changing the requested look by marking the mailer before returning both it and the exposed film to the photofinisher. The exposed film 132 is treated at a dry processor or development station 116 to produce images, which are then scanned at a scanner 118 and rendered into an electronic form suitable for further image processing. This electronic form can be analog or digital in character. The assigned code is read at code reader 134 and the code associated with the electronic form of the image. The code is passed to the customer database and the identity of the customer chosen look is retrieved and associated with the electronic form of the image. The electronic form of the image and the requested look is passed to an image processor 124 which applies the chosen look corrections to the image to form a processed image. The details of rendering an image according to a look can be stored in a database of look profiles 122. The image processor passes the processed image to printer 126 that produces pictures 130 that in turn are returned to the customer. Alternatively, the processed images can be returned to the customer as a permanent record, as for example as a computer disk 128, or they can be returned to the customer using the internet and the customer's web access device.

In another embodiment, the customer may purchase both unexposed film and a mailer through other channels, such as for example, a retail store, and, after taking pictures, return both to the photofinisher for picture execution. The details of the choices available can be included on the mailer.

Figure 3:
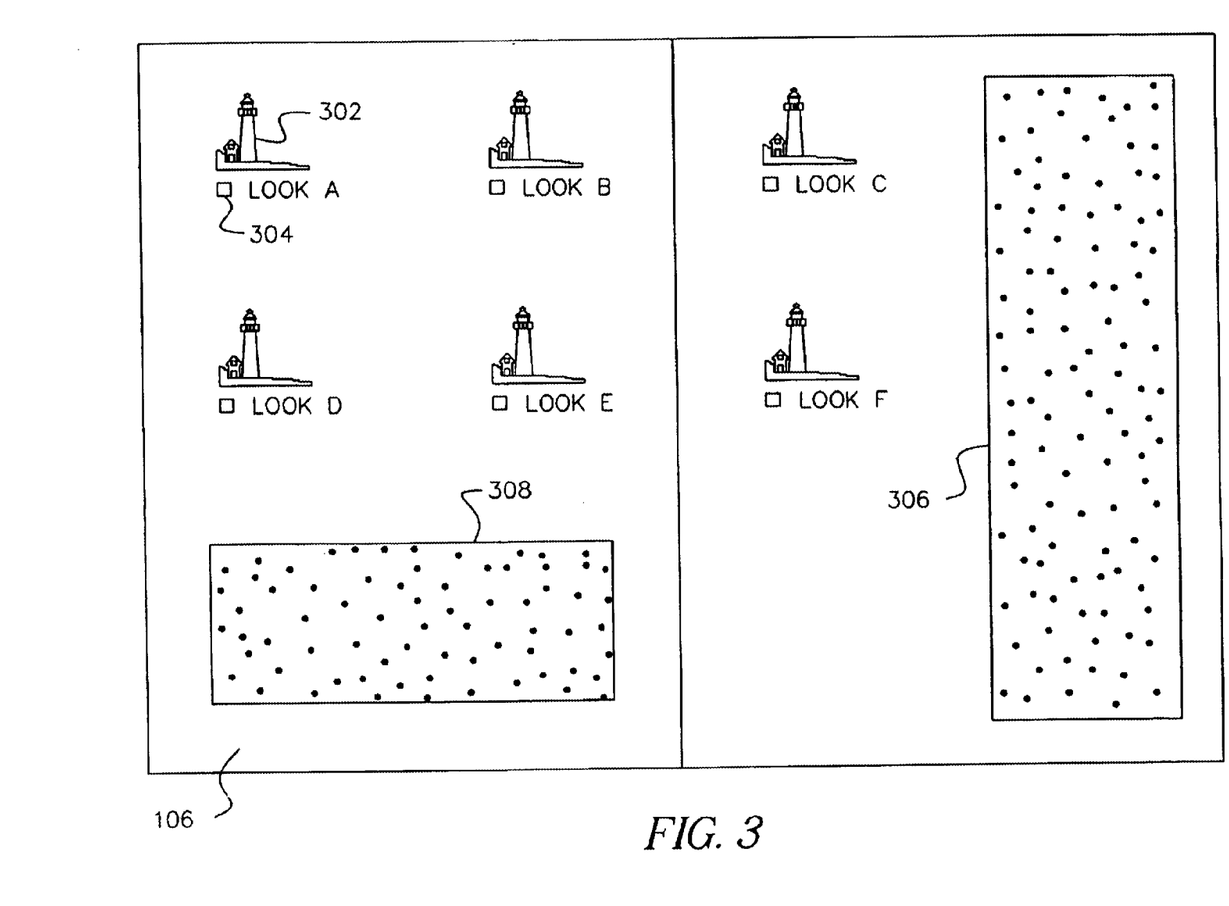
FIG. 3 is a brochure showing the example of looks offered according to an alternative embodiment of the present invention.

Alternatively, the details of the choices can be included in a brochure 106 available to customers and separately purchased film can be returned for photofinishing with choices indicated at the point of return. The availability of the descriptive and visual choices by way of a mailer or a brochure can be especially useful when the image quality available via the customer's web access device is inadequate for making detailed choices between the available options. In this situation the customer has the option of making look choices based on the brochure and inputting those choices at the web access device.

In another embodiment, the customer can refrain from making any choices about the desired look and after photofinishing, the customer's images can be made available to the customer at the web-site and the customer can choose to order that individual images from a roll be rendered with distinct looks. After the looks are chosen, the information is communicated back to the photofinisher for completion of order execution.

In a further embodiment, the customer can refrain from making any choices about the desired look and after photofinishing, the customer's images can be made available to the customer locally. The customer can then choose to order that individual images from a roll be rendered with distinct looks or that a common image be rendered with multiple looks. After the looks are chosen, the information is acted upon at the local photofinishing station for completion of order execution.

Figure 2:
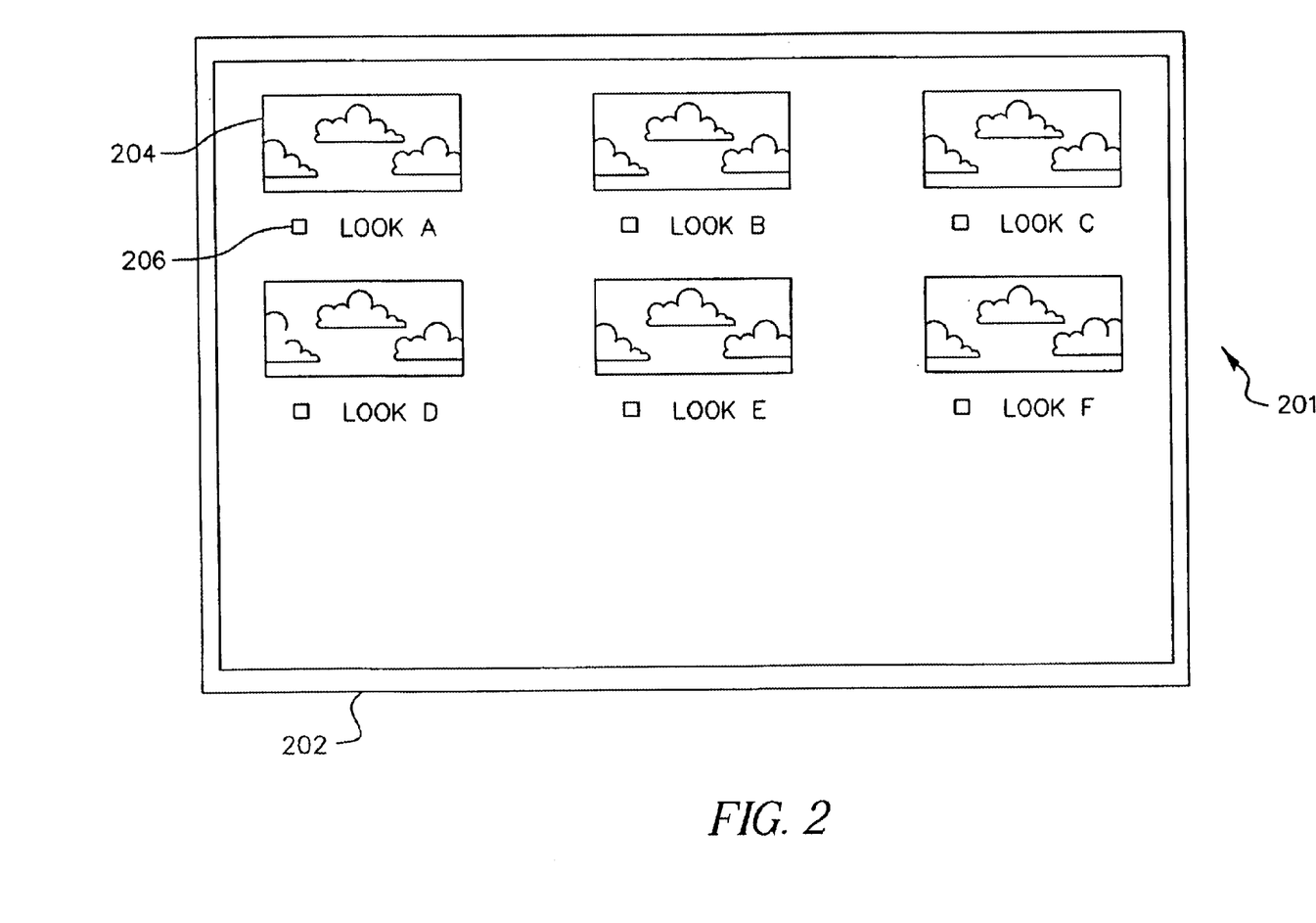
FIG. 2 is a screen print showing the examples of looks offered according to the present invention.

FIG. 2 illustrates a sample screen 201 as available to the customer. Here an exemplary scene 202 is repeated a multitude of times with variations in scene rendering and the customer is prompted to choose the rendering 203 most in keeping with the customer's intent.

FIG. 3 illustrates details of brochure 106. Here the customer is presented with multiple looks or renderings of an exemplary scene 302 and a brief name and choice box 304 for each presented look. The customer is also presented with detailed descriptions of the looks 306 and directions for employing the service to obtain photographs having a desired look 308. The availability of a well printed and controlled brochure can be especially useful when making choices about an on screen image since as a practical matter monitors may be mis-adjusted, worn or otherwise unable to properly present subtle variations in photographic colors and textures. A photofinisher can control the inks employed in printing a brochure or mailer to ensure that these inks adequately portray the gamut of available photographic colors. Further the image quality of a brochure or a mailer can be controlled to represent the variations in sharpness, contrast and grain available via this service.

Figure 4:
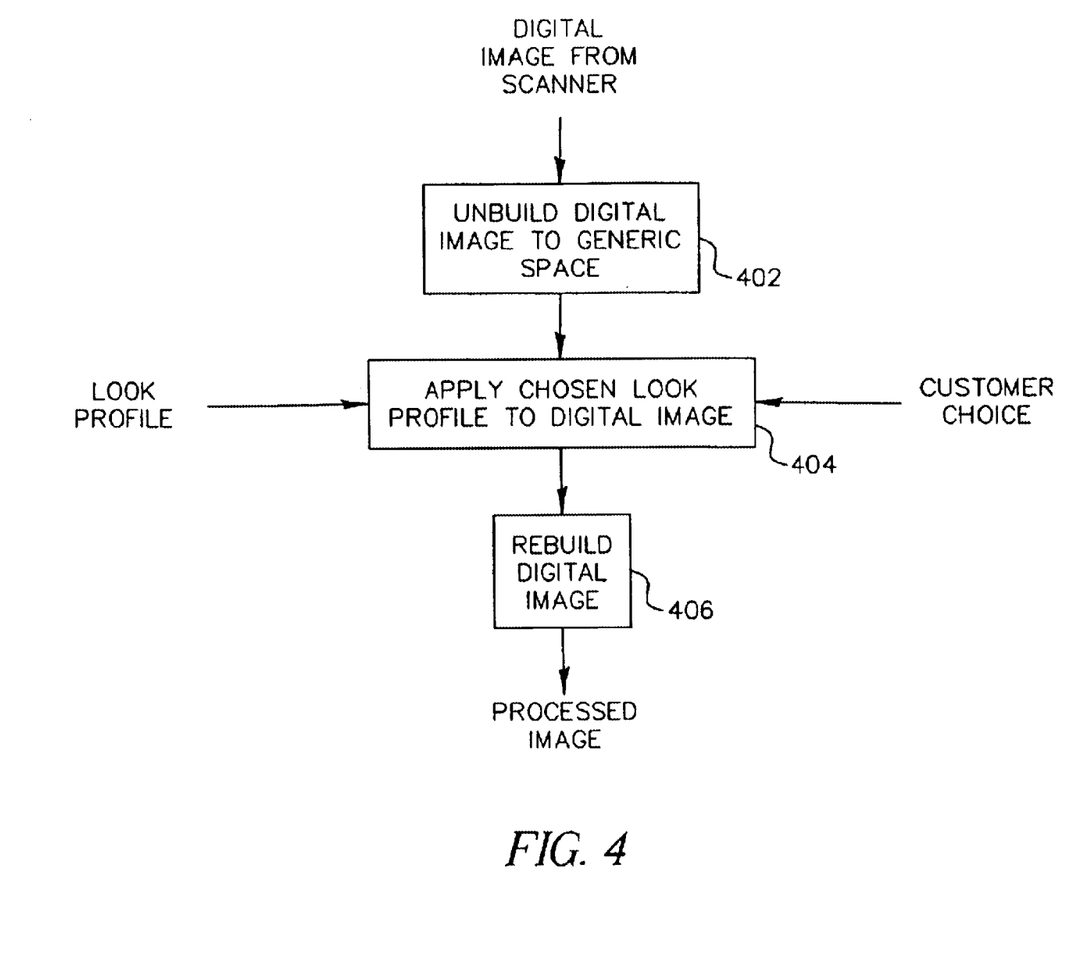
FIG. 4 is a flow chart showing the digital image-processing steps used to generate a digital image having a selected look according to the present invention.

FIG. 4 illustrates a flow chart of the digital image processing steps used to generate a digital image having a selected look according to the present invention. Here, an electronic image from a scanner with its' associated identity code is delivered to a module that translates 402 the image to a device independent color and tone space to produce an intermediate electronic image. The intermediate electronic image, still having an associated identity code, is modified 404 using a look profile accessed from a database of look profiles 122 according to the customer look choice retrieved by the identity code from the customer database 120 so as to form a second intermediate electronic image. This second intermediate image is formed 406 to a processed image suitable for delivery to a storage, display or output device. In another embodiment, use of a device independent intermediate space can be avoided by providing a series of look profiles, each of which incorporates device specific terms as needed. This latter approach can provide improved computational speed and is most appropriate when film densities, development process and scanner illumination and response is well controlled. The look profile can be provided from the database of look profiles in the form of a look-up-table, a matrix or otherwise, all as known in the art.

Figure 5A:
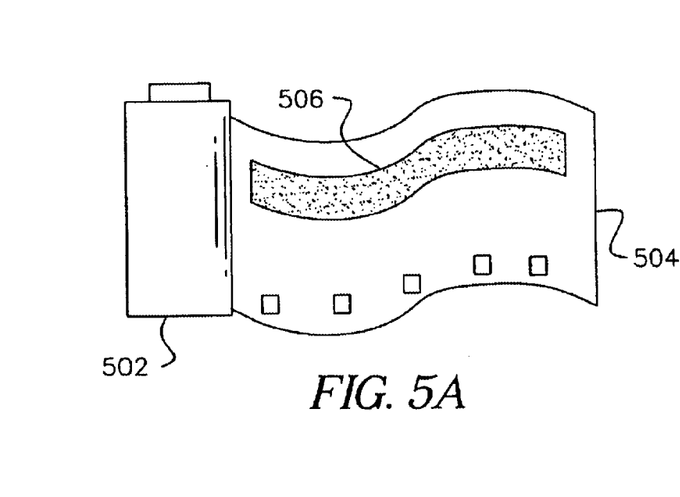
FIG. 5A is an illustration of a film bearing an optically readable region having an id for film type.
Figure 5B:
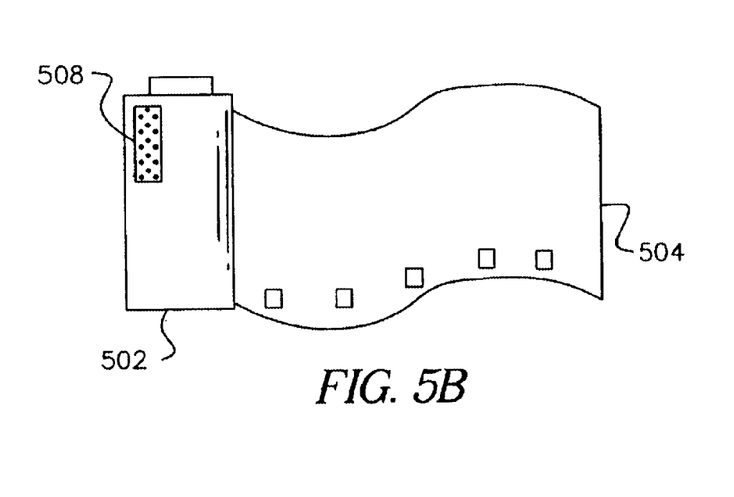
FIG. 5B is an illustration of a film cartridge bearing an interogatable microchip having an id for film type.
Figure 5C:
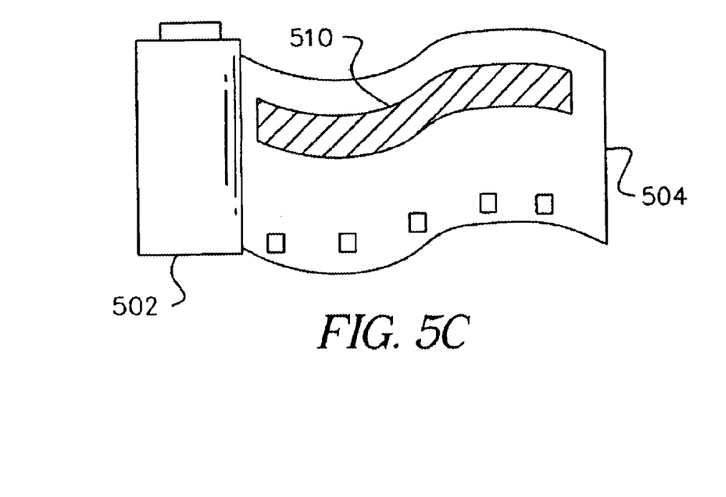
FIG. 5C is an illustration of a film bearing a magnetically readable region having an id for film type.
Figure 5D:
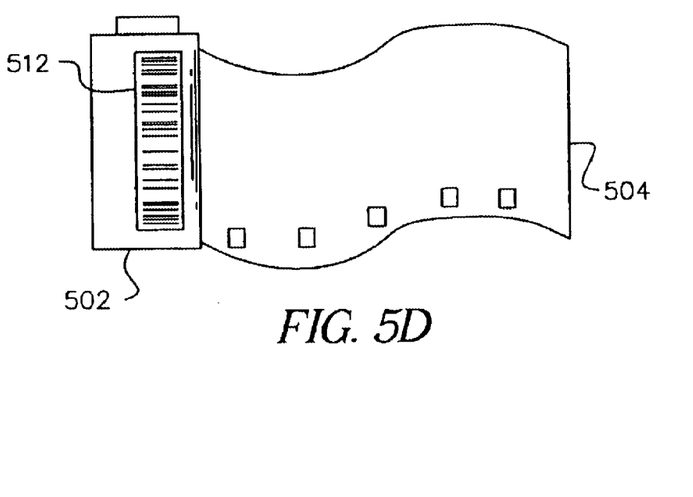
FIG. 5D is an illustration of a film cartridge bearing an optically readable serial number for identifying film type.

FIG. 5A illustrates a film cartridge 502 containing a film 504 in roll form. The film is shown partially withdrawn from the cartridge. The film bears an optically readable region 506 having an id for film type. The optically readable region can be fully readable before film development. FIG. 5B illustrates a film cartridge containing a film in roll form. The cartridge bears an interogatable microchip 508 having an id for film type. FIG. 5C illustrates a film cartridge containing a film in roll form. The film bears a magnetically readable region 510 having an id for film type. FIG. 5D illustrates a film cartridge bearing an optically readable serial number 512 for identifying film type. In another embodiment, not shown, region 512 can be a magnetically readable region. In yet another embodiment, not shown, region 512 can be a plain text identifier. In all cases the identifier can serve to both identify the particular film sample for order processing and it can serve to identify the thermal processing required by the current photothermographic film. While specific film cartridge configurations are illustrated in the figure, any art known film cartridge or canister can be employed. Additionally, the cartridge or canister can have a DX code, IX code or mechanical interlock, which identifies the contained film as a photothermographic film. DX codes, IX coding are well known in the photographic arts as are mechanical interlocks for preventing unintended operations. The code or id can additionally be employed as described in U.S. patent application Ser. No. 09/456,613 to Szajewski et al, filed Dec. 8, 1999.

While any camera speed film can be employed in the practice of this invention, the ability to provide rapid and convenient photo processing is greatly facilitated by employing a film designed for easy photofinishing. A dry process film is such a film.

In one embodiment, a dry-process film can be characterized as a light sensitive silver halide film having an incorporated developer in a binder on a support and capable of forming a differentiable machine-readable image consisting of a non-diffusible dye by the application of heat.

In a second embodiment, a dry-process film can be characterized as a light sensitive silver halide film capable of forming a differentiable machine readable image consisting of a non-diffusible dye by the application of little to no processing solvent and a laminate layer where the dry-process film or the laminate layer has an incorporated developer.

Suitable dry-process films and suitable components are described by Irving et al, U.S. Ser. No 09/475,510 filed Dec. 30, 1999, by Szajewski, et al, U.S. Pat. No. 6,048,110, by Ishikawa et al U.S. Pat. Nos. 5,756,269 and 5,858,629, by Ishikawa, U.S. Pat. No. 6,022,673, by Kikuchi, U.S. Pat. Nos. 5,888,704 and 5,965,332, by Okawa, et al, U.S. Pat. No. 5,851,749, by Takeuchi, U.S. Pat. No. 5,851,745, by Makuta et al, U.S. Pat. No. 5,871,880, by Morita, et al, U.S. Pat. No. 5,874,203, by Asami et al, U.S. Pat. No. 5,945,264, by Kosugi et al, U.S. Pat. No. 5,976,771, and by Ohkawa et al, U.S. Pat. No. 6,051,359.

It is noted that improper processing of a dry process film may result in poor to totally destroyed images. Thus, it is beneficial to provide an identification or an interlock on a film cartridge or cassette similar to the id's shown in FIGS. 5A–5D, such that a processor adapted to dry process films will only accept films intended for dry process. Further, a reader 1000 (FIG. 1) can be provided on a dry processor or developer 116 that interrogates presented films for compatibility with dry processing. Reader 1000 can be an automated reader or a user operated interface that requires a positive user action to enable acceptance of a presented film as compatible.

It is beneficial for the production of quality images that a processor adapted for dry process film accepts only films intended for dry-film processing. Accordingly, in a preferred embodiment, the processor is adapted to identify the film type using the id and to accept only films suitable for dry processing in the processor. In another embodiment, the cartridge having a dry process film carries a human readable indicator to warn photo-processors to employ only the appropriate dry process. When a dry process film is provided as a film plus lens unit, otherwise known as a one-time use camera (OTUC), then the id or humanly readable indicator can be associated with the camera body.

In a further aspect, the ability to apply a variety of looks to an electronic image derived from a film by scanning can be facilitated by employing a film designed for scanning. Such a film is called a scan-only film.

The film can have long exposure latitude, preferably at least 3.0 log E, more preferably at least 4.0 log E and even more preferably at least 5.0 log E. The long latitude facilitates proper capture of scene characteristics under a variety of lighting conditions. The film can have a high sensitivity, preferably having a sensitivity of at least ISO 100, more preferably having a sensitivity of at least ISO 200 and most preferably having a sensitivity of at least ISO 400. Sensitivities of up to ISO 3200 or even higher are specifically contemplated. The high sensitivity further facilitates capture of scene characteristics under poor lighting conditions and when the scene subject is in motion since the high sensitivity permits the use of a fast shutter time on a camera.

A scan-only film can be characterized as having one or more of the following properties. The film can form a low ganmma image after development. The low gamma, especially when combined with the long latitude, ensures that the formed densities are easily scanned without the introduction of scanner noise. Image gammas of up to about 0.7 are preferred, gammas of up to about 0.55 are more preferred and image gammas of up to about 0.45 are even more preferred. The film can exhibit a minimal gamma after development processing. Image gammas above 0.2 are specifically contemplated. Although a black and white film can be employed to facilitate some of the features of the invention, a color film can best exploit the full features of the present invention. When the film is a color film it can have individual layer units each sensitive to red, green or blue light as described in U.S. Pat. No. 6,021,277 of Sowinski et al. Alternatively, the film can have layer units sensitive to white light and to specific subsets of white light as described in U.S. Pat. No. 5,962,205, of Arakawa et al. While the layer units of a scan-only color film can be sensitized using any know color sensitization scheme, they are preferably sensitized in a manner that approximates the sensitivity of the human eye. A useful photopic sensitization scheme is described by Giorgianni, et al. in U.S. Pat. No. 5,582,961. Specific sensitization dyes and schemes especially useful for photopic sensitization are disclosed by Buitano et al. in United States Patent applications U.S. Ser. No. 08/925,835 filed Sep. 5, 1997, U.S. Ser. No. 09/129,269 filed Aug. 5, 1998, U.S. Ser. No. 09/129,658 filed Aug. 5, 1998, U.S. Ser. No. 09/129,358 filed Aug. 5, 1998, U.S. Ser. No. 09/259,694 filed Mar, 1, 1999, U.S. Ser. No. 09/259,988 filed Mar. 1, 1999. When the film is a color film it can preferably comprise little to no masking coupler. In a preferred embodiment each layer unit of a color film will comprise less than about 0.02 mmole per $m^2$ of masking coupler. Masking coupler is incorporated in a film intended for optical printing and performs a color correction step during chemical development. Elimination of the masking coupler provides for improved signalto-noise characteristics during image capture and obviates the need to electronically counteract its effect. In like manner, the film can exhibit low levels of interimage.

Light sensitive elements or films useful in the practice of this invention can be supplied in standard film cartridges or in thrust cartridges or cassettes, all as known in the art. Thrust cartridges are disclosed by Kataoka et al U.S. Pat. No. 5,226,613; by Zander U.S. Pat. No. 5,200,777; by Dowling et al U.S. Pat. No. 5,031,852; by Pagano et al, U.S. Pat. No. 5,003,334 and by Robertson et al U.S. Pat. No. 4,834,306. These thrust cartridges can be employed in reloadable cameras designed specifically to accept them, in cameras fitted with an adapter designed to accept such film cassettes or in one-time-use cameras designed to accept them. Narrow-bodied one-time-use cameras suitable for employing thrust cartridges are described by Tobioka et al U.S. Pat. No. 5,692,221. While the film can be mounted in a one-time-use camera in any manner known in the art, it is especially preferred to mount the film in the one-time-use camera such that it is taken up on exposure by a thrust cartridge. Film supplied in a thrust cartridge can be supplied in any convenient width. Widths of about 22 mm as employed in the Advanced Photo System (APS) are contemplated as well as wider formats, such as 35 mm or even wider.

Figure 6:
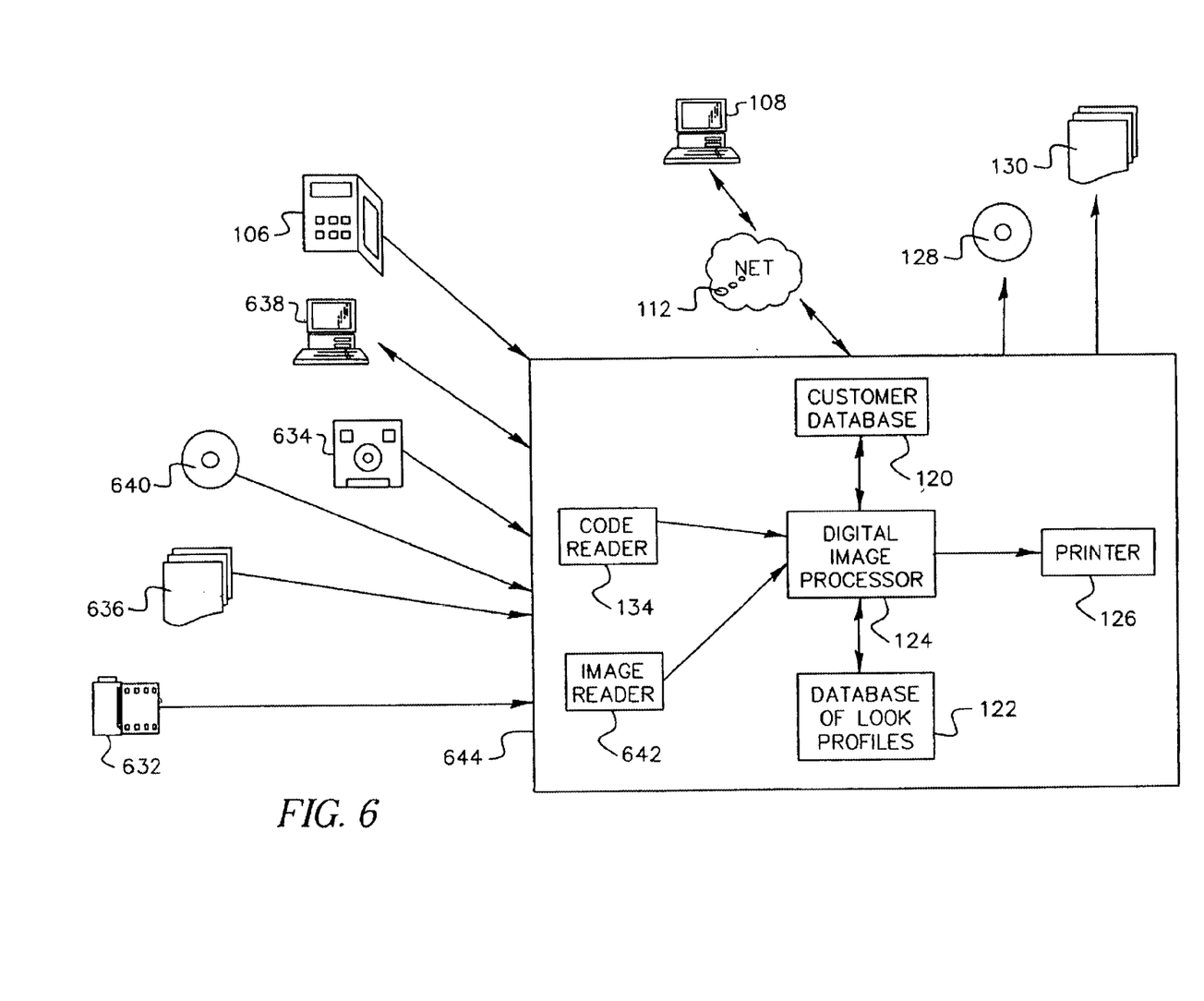
FIG. 6 is a block diagram showing a photofinishing system capable of accepting and processing images according to the present invention.

With reference to FIG. 6, reference numeral 644 is a photofinishing unit having a local interactive computer input device 638. A customer can provide photofinishing unit 644 with an image in permanent form. Specific examples of an image in permanent form include but are not limited to: an image on an exposed and processed film 632; an image in machine readable magnetic form 634; an image in human viewable form 636; and an image in machine readable optical form 640. Alternatively, the customer can provide the photofinishing unit with an image in transient form as for example via signals carried on a cable, via transmitted electromagnetic signals and via transmitted optical or IR signals. Photofinishing unit 644 has a reader unit 642 capable of receiving the image presented by the customer. In practice, photofinishing unit 644 has several reader units each adapted to receiving images from a particular permanent or transient source. When the image is presented in analog form, the photofinisher further has a digitization device, not shown, to convert the electronic image to a digital image after reading. The photofinisher further has a code reader adapted to retrieving an identifying code from the image source.

Photofinishing unit 644 of FIG. 6 can be modified to include a development station as illustrated in FIG. 1. In this embodiment, the photofinishing unit 644 can then serve as a free standing kiosk or a home, store or office unit with optional internet connectivity. In this situation the customer can provide his own photofinishing. A specific apparatus suitable for such photofinishing is described by Szajewski et al in U.S. Pat. No. 6,048,110, by Stoebe et al in U.S. Pat. No. 126,062,746and in related co-filed applications of Stoebe et al. U.S. Ser. No. 09/026,586; and 09/206,914 both filed Dec. 7, 1998. This photofinishing apparatus can be adapted for hardwire connectivity to a computer or for wireless connectivity as known in the art. In this embodiment, the software for providing the digital portion of photofinishing may be supplied to the local computer in any manner known in the art, and the intermediacy of an internet or other remote connectivity can be avoided. This embodiment is preferred for those situations where convenient and highly dispersed photofinishing is desired.

The customer is presented with the opportunity to choose the desired image "look" for his/her images. The possible choices can be presented to the customer in hard copy form, as for example in the form of a poster or brochure 106. Alternatively, the possible choices can be presented to the customer in soft copy form via the local interactive computer input device 638. The customer "look" choices are recorded in the customer database 120 along with the identifying code for the image. If an image does not yet have an identifying code, a code is assigned, recorded and associated with the customer in the customer database. The code is also associated with the digital image. The digital image processor 124 receives the digital image, queries the customer database 120 for instructions as to the customer's chosen "look" for each image, queries the database of "look" profiles for instructions as to how to transform the digital image to provide the desired "look" and then transforms the digital image to a second digital image capable of providing the desired "look" on output. The second digital image is provided to a printer 126 to make pictures 130 for the customer.

In other embodiments, the second digital image is provided to the customer as a machine readable optical disc 128, on machine readable magnetic media, not shown, transmitted to the customer's soft display 108 via the internet 112 or otherwise provided to the customer in any manner known in the art. In one embodiment, the photofinisher 644 is a stand-alone kiosk. In another embodiment, the photofinisher is an attended and customer operated station. In yet another embodiment, the photofinisher is located remotely from the customer and images and directions are left at a remote station. In yet another embodiment, the customer can provide the photofinisher with images in transient form, as for example from his local computer via the internet and provide image "look" choices. The processed images can be returned to the customer in permanent form as described earlier, or returned to the customer in transient form, as for example, via the internet.

Once distinguishable color records have been formed in the processed photographic elements, conventional techniques can be employed for retrieving the image information for each color record and manipulating the record for subsequent creation of a color balanced viewable image. For example, it is possible to scan the photographic element successively within the blue, green, and red regions of the spectrum or to incorporate blue, green, and red light within a single scanning beam that is divided and passed through blue, green, and red filters to form separate scanning beams for each color record. If other colors are imagewise present in the element, then appropriately colored light beams are employed. A simple technique is to scan the photographic element point-by-point along a series of laterally offset parallel scan paths. A sensor that converts radiation received into an electrical signal notes the intensity of light passing through the element at a scanning point. Most generally this electronic signal is further manipulated to form a useful electronic record of the image. For example, the electrical signal can be passed through an analog-to-digital converter and sent to a digital computer together with location information required for pixel (point) location within the image. In another embodiment, this electronic signal is encoded with colorimetric or tonal information to form an electronic record that is suitable to allow reconstruction of the image into viewable forms such as computer monitor displayed images, television images, printed images, and so forth.

One of the challenges encountered in producing images from information extracted by scanning is that the number of pixels of information available for viewing is only a fraction of that available from a comparable classical photographic print. It is, therefore, even more important in scan imaging to maximize the quality of the image information available. Enhancing image sharpness and minimizing the impact of aberrant pixel signals (i.e., noise) are common approaches to enhancing image quality. A conventional technique for minimizing the impact of aberrant pixel signals is to adjust each pixel density reading to a weighted average value by factoring in readings from adjacent pixels, closer adjacent pixels being weighted more heavily.

The elements of the invention can have density calibration patches derived from one or more patch areas on a portion of unexposed photographic recording material that was subjected to reference exposures, as described by Wheeler et al U.S. Pat. No. 5,649,260, Koeng at al U.S. Pat. No. 5,563,717, and by Cosgrove et al U.S. Pat. No. 5,644,647.

Illustrative systems of scan signal manipulation, including techniques for maximizing the quality of image records, are disclosed by Bayer U.S. Pat. No. 4,553,156; Urabe et al U.S. Pat. No. 4,591,923; Sasaki et al U.S. Pat. No. 4,631,578; Alkofer U.S. Pat. No. 4,654,722; Yamada et al U.S. Pat. No. 4,670,793; Klees U.S. Pat. Nos. 4,694,342 and 4,962,542; Powell U.S. Pat. No. 4,805,031; Mayne et al U.S. Pat. No. 4,829,370; Abdulwahab U.S. Pat. No. 4,839,721; Matsunawa et al U.S. Pat. Nos. 4,841,361 and 4,937,662; Mizukoshi et al U.S. Pat. No. 4,891,713; Petilli U.S. Pat. No. 4,912,569; Sullivan et al U.S. Pat. Nos. 4,920,501 and 5,070,413; Kimoto et al U.S. Pat. No. 4,929,979; Hirosawa et al U.S. Pat. No. 4,972,256; Kaplan U.S. Pat. No. 4,977,521; Sakai U.S. Pat. No. 4,979,027; Ng U.S. Pat. No. 5,003,494; Katayama et al U.S. Pat. No. 5,008,950; Kimura et al U.S. Pat. No. 5,065,255; Osamu et al U.S. Pat. No. 5,051,842; Lee et al U.S. Pat. No. 5,012,333; Bowers et al U.S. Pat. No. 5,107,346; Telle U.S. Pat. No. 5,105,266; MacDonald et al U.S. Pat. No. 5,105,469; and Kwon et al U.S. Pat. No. 5,081,692. Techniques for color balance adjustments during scanning are disclosed by Moore et al U.S. Pat. No. 5,049,984 and Davis U.S. Pat. No. 5,541,645.

The digital color records once acquired are in most instances adjusted to produce a pleasingly color balanced image for viewing and to preserve the color fidelity of the image bearing signals through various transformations or renderings for outputting, either on a video monitor or when printed as a conventional color print. Techniques for transforming image-bearing signals after scanning are disclosed by Giorgianni et al. U.S. Pat. No. 5,267,030, Buhr et al. U.S. Pat. No. 5,528,339, Higgins et al. U.S. Pat. No. 5,835,627 and Cottrell et al. U.S. Pat. No. 5,694,484, and Arakawa, et al, U.S. Pat. No. 5,962,205 the disclosures of which are incorporated by reference. Further illustrations of the capability of those skilled in the art to manage color digital image information are provided by Giorgianni and Madden *Digital Color Management*, Addison-Wesley, 1998. The signal transformation techniques disclosed are further modified so as to deliver an image that incorporates the look selected by a customer.

An image scanner 118 is used to scan an imagewise exposed and photographically processed color negative element delivered from developing station 116. As the element is scanned pixel-by-pixel using an array detector, such as an array charge-coupled device (CCD), or line-by-line using a linear array detector, such as a linear array CCD, a sequence of R, G, and B picture element signals are generated that can be correlated with spatial location information provided from the scanner. Signal intensity and location information is fed to Digital Image Processor 124, and the information is transformed into an electronic form R', G', and B' embodying the customer look preference, which can be stored in any convenient storage device or otherwise delivered to the customer by any convenient method. In one embodiment, it is specifically contemplated to scan a developed image to red, green and blue light to retrieve imagewise recorded information and to scan the same image to infrared light for the purpose of recording the location of non-image imperfections. When such an imperfection or "noise" scan is employed, the signals corresponding to the imperfection can be employed to provide a software correction so as to render the imperfections less noticeable or totally non-noticeable in soft or hard copy form. The hardware, software and technique for achieving this type of imperfection reduction is described by Edgar in U.S. Pat. No. 5,266,805 and by Edgar et al. in WO 98/31142, WO 98/34397, WO 99/40729, WO 99/42954 all deriving priority from United States patent applications. Further, the developed image can be scanned multiple times by a combination of transmission and reflection scans, optionally in the infrared and the resultant files combined to produce a single file representative of the initial image. Such a procedure is described by Edgar in U.S. Pat. No. 5,465,155; 5,519,510; 5,790,277 and 5,988,896 and by Edgar et al. in WO 98/25399; WO 99/43148 and WO 99/43149.

A video monitor of computer 638, that receives the digital image information modified for its requirements, allows viewing of the image information received from the digital image processor. Instead of relying on a cathode ray tube of a video monitor, a liquid crystal display panel or any other convenient electronic image viewing device can be substituted. The video monitor typically relies upon a picture control apparatus that can include a keyboard and cursor, enabling the workstation user to provide image manipulation commands for modifying the video image displayed and any image to be recreated from the digital image information.

Any modifications of the image can be viewed as they are being introduced on the video display 638 and stored. The modified image information R', G', and B' can be sent to an output device to produce a recreated image for viewing. The output device can be any convenient conventional element writer, such as a thermal dye transfer, ink-jet, electrostatic, electrophotographic, or other type of printer. The output device can be used to control the exposure of a conventional silver halide color paper. The output device creates an output medium that bears the recreated image for viewing. It is the image in the output medium that is ultimately viewed and judged by the end user for noise (granularity), sharpness, contrast, and color balance. The image on a video display may also ultimately be viewed and judged by the end user for noise, sharpness, tone scale, color balance, and color reproduction, as in the case of images transmitted between parties on the World Wide Web of the Internet computer network.

Figure 7:
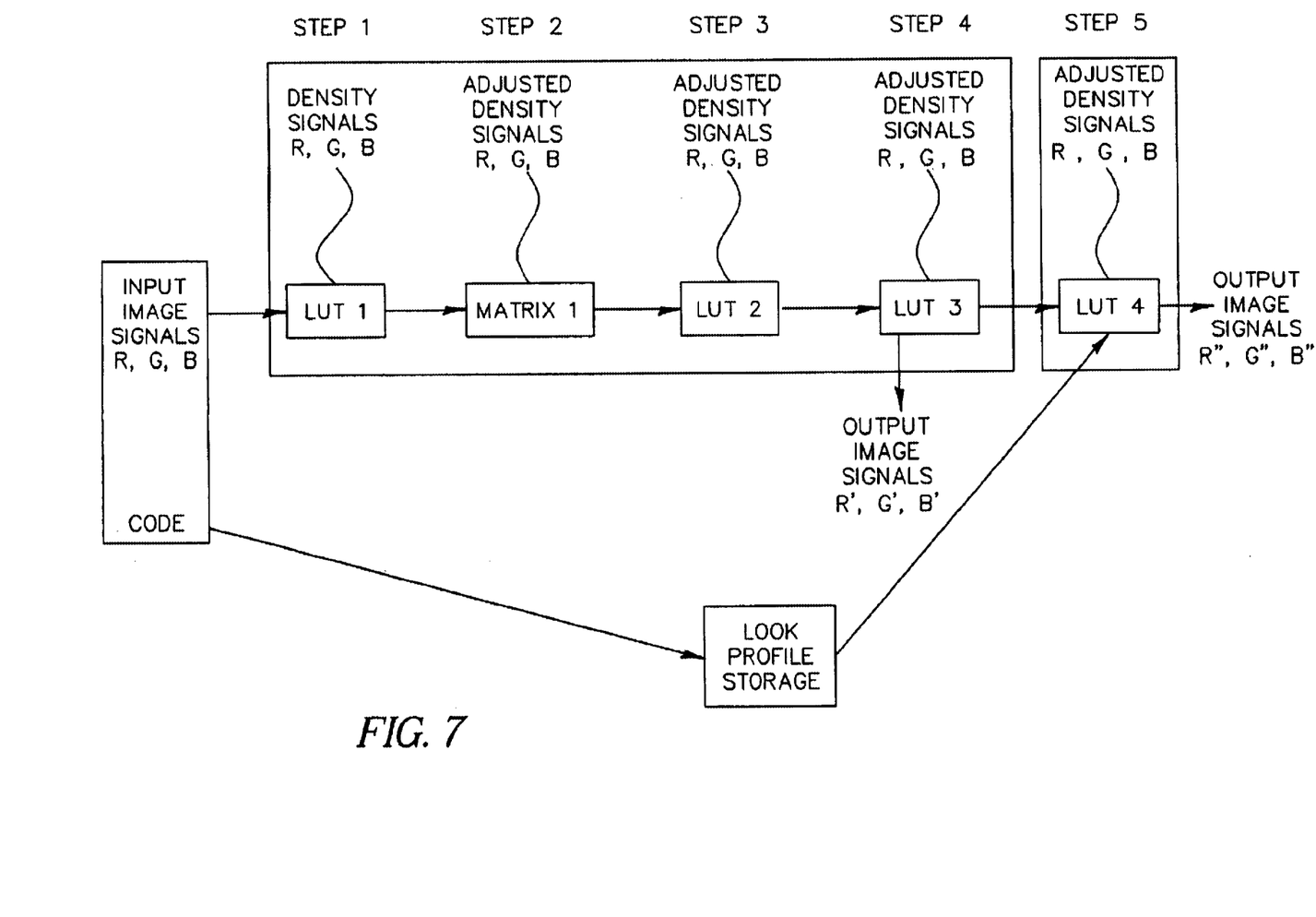
FIG. 7 is a block diagram showing electronic signal processing of input image-bearing signals to form output image-bearing signals that have been modified following a customer choice.

FIG. 7 illustrates a specific embodiment of the electronic signal processing of input image-bearing signals to form output image-bearing signals that have been modified following a customer choice of look. The mathematical operations required to transform R, G, and B image-bearing signals to the intermediary data may consist of a sequence of matrix operations and look-up tables (LUT's).

Referring to FIG. 7 input image-bearing signals R, G, and B are transformed to intermediary data values corresponding to the R', G', and B' output image-bearing signals required to appropriately reproduce the color image on the reference output device as follows:

Step (1) The R, G, and B image-bearing signals, which correspond to the measured transmittances of the film, are converted to corresponding densities in the computer used to receive and store the signals from a film scanner by means of 1-dimensional look-up table LUT 1.

Step (2) The densities from step (1) are then transformed using matrix 1 derived from a transform apparatus to create intermediary image-bearing signals.

Step (3) The densities of step (2) are optionally modified with a 1-dimensional look-up table LUT 2 derived such that the neutral scale densities of the input film are transformed to the neutral scale densities of the reference.

Step (4) The adjusted density signals of step (3) are transformed through a 1-dimensional look-up table (LUT 3) to create corresponding R', G', and B' output image-bearing signals for the reference output device. The R', G' and B' output image-bearing signals for the reference device can be stored at this step. This storage is especially useful in case the customer later chooses to request a different look for the image or has requested that the same image be supplied with multiple looks. The intermediate stored image can be readily retrieved and transformed to a new final image without the necessity of repeating steps 1 through 4. This can provide a saving in computational power and provide a benefit in increased turn-around time for image formation. The R', G' and B' values for the intermediate image can be stored at the photofinisher or delivered to the customer as a digital file for later use.

Step (5) The densities of step (4) are transformed through a 1-dimensionsal look-up table LUT 4 to create corresponding R", G", and B" output image bearing signals for a reference output device that are modified to provide the customer selected appearance or "look." Each loadable LUT 4 corresponds to a particular "look" profile from the set of available "look" profiles. The loading of a particular LUT 4 is based on the customer choice of "look" as identified by the code associated with each image or roll of images. Each loadable LUT 4 is in turn pre-constructed to provide an output that delivers the customer selected appearance or "look". By way of example, when the customer has selected a "brilliant color" look, the values in the associated LUT 4 are designed so as to intensify the chroma of the reproduced colors without modifying the hue of those colors. It is preferred that code values for hues corresponding to important memory colors such a human flesh be little changed on such a transformation. For this reason LUT 4 is likely to have distinctly non-linear effect on chroma. Conversely, when the customer has selected an "old fashion sepia" look, the values in the associated LUT 4 are chosen to so as to collapse the hues and chromas associated with each code value while maintaining tonal values.

It will be understood that individual look-up tables are typically provided for each input color. In one embodiment, three 1-dimensional look-up: tables can be employed, one for each of a red, green, and blue color record. In another embodiment, a multi-dimensional look-up table can be employed as described by D'Errico at U.S. Pat. No. 4,941,039. It will be appreciated that the output image-bearing signals for the reference output device of step 5 above may be in the form of device-specific code values or the output image-bearing signals may require further adjustment to become device specific code values. Such adjustment may be accomplished by further matrix transformation or 1-dimensional look-up table transformation, or a combination of such transformations to properly prepare the output image-bearing signals for any of the steps of transmitting, storing, printing, or displaying them using the specified device.

In a variation, the R, G, and B image-bearing signals from a transmission scanner are converted to an image manipulation and/or storage metric which corresponds to a measurement or description of a single reference image-recording device and/or medium and in which the metric values for all input media correspond to the trichromatic values which would have been formed by the reference device or medium had it captured the original scene under the same conditions under which the input media captured that scene. For example, if the reference image recording medium was chosen to be a specific color negative film, and the intermediary image data metric was chosen to be the measured RGB densities of that reference film, then for an input color negative film according to the invention, the R, G, and B image-bearing signals from a scanner would be transformed to the R', G', and B' density values corresponding to those of an image which would have been formed by the reference color negative film had it been exposed under the same conditions under which the color negative recording material according to the invention was exposed.

In another variation, if the reference image recording medium was chosen to be a specific color negative film, and the intermediary image data metric was chosen to be the predetermined R', G', and B' intermediary densities of step 2 of that reference film, then for an input color negative film according to the invention, the R, G, and B image-bearing signals from a scanner would be transformed to the R', G', and B' intermediary density values corresponding to those of an image which would have been formed by the reference color negative film had it been exposed under the same conditions under which the color negative recording material according to the invention was exposed.

Thus each input film calibrated to be compatible with the present method would yield, insofar as possible, identical intermediary data values corresponding to the R', G', and B' code values required to appropriately reproduce the color image which would have been formed by the reference color negative film on the reference output device. Uncalibrated films may also be used with transformations derived for similar types of films, and the results would be similar to those described.

The mathematical operations required to transform R, G, and B image-bearing signals to the intermediary data metric of this preferred embodiment may consist of a sequence of matrix operations and 1-dimensional LUTs. Three tables are typically provided for the three input colors. It is appreciated that such transformations can also be accomplished in other embodiments by employing a single mathematical operation or a combination of mathematical operations in the computational steps produced by the host computer including, but not limited to, matrix algebra, algebraic expressions dependent on one or more of the image-bearing signals, and n-dimensional LUTs. In one embodiment, matrix 1 of step 2 is a 3×3 matrix. In a more preferred embodiment, matrix 1 of step 2 is a 3×10 matrix. In a preferred embodiment, the 1-dimensional LUT 4 in step 5 transforms the intermediary image-bearing signals according to a color photographic paper characteristic curve, thereby reproducing normal color print image tone scale. In another preferred embodiment, LUT 4 of step 5 transforms the intermediary image-bearing signals according to a modified viewing tone scale that is more pleasing when viewed on a soft display device.

Due to the complexity of these transformations, it should be noted that the transformation from R, G, and B to R', G', and B' may often be better accomplished by a 3-dimensional LUT. Such 3-dimensional LUTs may be developed according to the teachings J. D'Errico in U.S. Pat. No. 4,941,039.

It is to be appreciated that while the images are in electronic form, the image processing is not limited to the specific manipulations described above. Other useful image manipulation sequences are described by Buhr et al in EP 0,961,482, EP 0,961,483, EP 0,961,484, EP 0,961,485, and EP 0,961,486 which claims priority from U.S. Ser. No. 09/085,788, U.S. Ser. No. 09/086,044, U.S. Ser. No. 09/086,146, U.S. Ser. No. 09/086,333 all filed May 28, 1998 and U.S. Ser. No. 09/104,548 filed June 25, 1998. While the image is in this form, additional image manipulation may be used including, but not limited to, scene balance algorithms (to determine corrections for density and color balance based on the densities of one or more areas within the processed film), tone scale manipulations to amplify film underexposure gamma as described by Goodwin et al in U.S. Pat. No. 5,134,573, non-adaptive or adaptive sharpening via convolution or unsharp masking, red-eye reduction, and non-adaptive or adaptive grain-suppression. Moreover, the image may be artistically manipulated, zoomed, cropped, and combined with additional images or other manipulations known in the art. Once the image has been corrected and any additional image processing and manipulation has occurred, the image may be electronically transmitted to a remote location or locally written to a variety of output devices including, but not limited to, silver halide film or paper writers, thermal printers, electrophotographic printers, ink-jet printers, display monitors, CD disks, optical and magnetic electronic signal storage devices, and other types of storage and display devices as known in the art.

The invention has been described in detail with particular reference to certain preferred embodiments thereof, but it will be understood that variations and modifications can be effected within the spirit and scope of the invention.

What is claimed is:

1. An image processing method comprising the steps of:

creating a user order based on a user selected dry process photographic film and a user selected appearance characteristic that is to be associated with at least one image exposed on the user selected photographic film, said user selected appearance characteristic being selected from a plurality of appearance characteristics;

developing the user selected photographic film to produce images captured by the user;

scanning the developed user selected photographic film to produce a digital record of the captured images; and digitally processing the digital record file of the captured images based on the user selected appearance characteristic to produce processed images which reflect the user selected appearance characteristic.

2. A method according to claim 1, wherein the appearance characteristics are at least one of a color reproduction, a portraiture, a brilliant color appearance, a black and white print, sepia tones, a color intensity, a contrast level, a grain level and a noise level.

3. An imaging system comprising:

a developing station for developing a dry process photographic film to produce images exposed on the film;

a code reader for reading a unique code on said photographic film, said unique code enabling an association of a selected appearance characteristic with the images from said developed photographic film;

a scanner for scanning said developed photographic film to provide for a digital record file of said images; and digital image processor for processing the digital record file based on said unique code, so as to produce processed images which have been corrected to reflect the selected appearance characteristic.

4. A system according to claim 3, wherein the appearance characteristic is at least one of a specific color reproduction for the images, a portraiture, a brilliant color appearance, a black and white print of the image, sepia tones, a color intensity, a contrast level, a grain level and a noise level.

5. A method of providing image processing services by a photofinisher to a customer, the method comprising the steps of:

creating a customer order based on an unexposed dry process photographic film and an appearance characteristic selected by a customer which is to be associated with images captured on the selected photographic film, said appearance characteristic being selected by the customer from a plurality of appearance characteristics;

assigning a code representative of at least one of said selected unexposed photographic film and said customer order;

storing the code in a customer database; and supplying the customer with the selected unexposed photographic film.

6. A method of providing image processing services by a photofinisher to a customer, the method comprising the steps of:

creating a customer order based on an unexposed photographic film and an appearance characteristic selected by a customer which is to be associated with images captured on the selected photographic film, said appearance characteristic being selected by the customer from a plurality of appearance characteristics:

assigning a code representative of at least one of said selected unexposed photographic film and said customer order;

storing the code in a customer database: an;

supplying the customer with the selected unexposed photograihic film;

wherein after exposure of the film by the customer and return of the exposed film to the photofinisher, the method comprises the further steps of:

developing the photographic film to produce images captured by the customer;

scanning the developed photographic film to produce a digital record of the captured images;

reading the code on the photographic film and associating the code with the digital record file of the captured images;

searching said customer database and retrieving the selected appearance characteristic based on the stored code;

associating the selected appearance characteristic with the digital record of the captured images; and digitally processing the digital record file of the captured images based on the selected appearance characteristic to produce processed images which reflect the selected appearance characteristic.

7. A method according to claim 6, wherein said step of supplying the customer with the selected photographic film comprises the further step of supplying the customer with a mailer to permit the customer to return the selected photographic film.

* * * * *